US007034741B2

(12) United States Patent
Chon et al.

(10) Patent No.: US 7,034,741 B2
(45) Date of Patent: Apr. 25, 2006

(54) APPARATUS FOR DETECTING POSITION INFORMATION OF A MOVING OBJECT

(75) Inventors: Hae-Don Chon, Yongin-shi (KR); Jong-Chol Seol, Suwon-shi (KR)

(73) Assignee: Samsung Electronics Co., Ltd., (KR)

( * ) Notice: Subject to any disclaimer, the term of this patent is extended or adjusted under 35 U.S.C. 154(b) by 0 days.

(21) Appl. No.: 10/656,081

(22) Filed: Sep. 4, 2003

(65) Prior Publication Data

US 2004/0239552 A1 Dec. 2, 2004

(30) Foreign Application Priority Data

Jun. 2, 2003 (KR) .................. P10-2003-0035271

(51) Int. Cl.
*G01S 13/74* (2006.01)
*G01S 13/06* (2006.01)

(52) U.S. Cl. ........................... 342/42; 342/44; 342/46; 342/51

(58) Field of Classification Search .................. 342/42, 342/44, 46, 50, 51, 56, 453–458; 340/10.1, 340/10.2, 10.5, 10.51, 5.21, 5.64, 5.72, 5.8, 340/505, 539.1, 901–903, 905, 907, 928, 340/933, 935, 988, 994
See application file for complete search history.

(56) References Cited

U.S. PATENT DOCUMENTS 3,633,158 A * 1/1972 Heibel ........................ 398/170
4,987,540 A * 1/1991 Luke, Jr. ..................... 701/24
5,164,732 A * 11/1992 Brockelsby et al. .......... 342/44
5,192,954 A * 3/1993 Brockelsby et al. .......... 342/42
5,196,846 A * 3/1993 Brockelsby et al. ..... 340/10.51
5,387,916 A * 2/1995 Cohn .......................... 342/44
5,428,363 A * 6/1995 D'Hont ...................... 343/742
5,510,794 A * 4/1996 Asbury et al.
5,552,789 A * 9/1996 Schuermann .............. 340/5.21

(Continued)

FOREIGN PATENT DOCUMENTS

EP 0 917 109 5/1999

(Continued)

OTHER PUBLICATIONS

"Design of Transponder Signals and Recievers for Automatic Vehicle Location and Identification Systems", Donaldson, R.;Communications, IEEE Transactions on [legacy, pre—1988] , vol.: 23, Issue: 5 , May 1975 Ps:489-500.*

*Primary Examiner*—John B. Sotomayor
(74) *Attorney, Agent, or Firm*—Dilworth & Barrese LLP

(57) ABSTRACT

An apparatus for detecting position information of a moving object. The apparatus includes a transponder, a communication module, and a reader. The transponder is installed on a predetermined location of a road and stores position information associated with the installed location. The communication module is mounted to a moving object, emits an RF (Radio Frequency) signal toward a road surface, and receives position information associated with the transponder's installation location from the nearest transponder using an RF signal. The reader receives position information associated with the transponder's installation location from the communication module, and reads a current position of the moving object. The apparatus minimizes a data error between the detected position information. The transponder installed on a road is driven by RF signals received from external devices, resulting in increasing a lifetime of the transponder. This apparatus minimizes the cost of OAM (Operation, Administration, and Maintenance).

9 Claims, 5 Drawing Sheets

U.S. PATENT DOCUMENTS

| | | | | | |
|---|---|---|---|---|---|
| 5,587,712 | A | * | 12/1996 | Boone et al. | 342/42 |
| 5,675,342 | A | * | 10/1997 | Sharpe | 340/10.2 |
| 5,701,127 | A | * | 12/1997 | Sharpe | 340/10.2 |
| 6,157,321 | A | * | 12/2000 | Ricci | 340/902 |
| 6,411,889 | B1 | * | 6/2002 | Mizunuma et al. | 701/117 |
| 6,466,139 | B1 | * | 10/2002 | Schmidt | 340/905 |
| 6,894,624 | B1 | * | 5/2005 | Kim et al. | 340/933 |
| 6,958,676 | B1 | * | 10/2005 | Morgan et al. | 340/5.72 |
| 2003/0137435 | A1 | * | 7/2003 | Haddad et al. | 340/994 |

FOREIGN PATENT DOCUMENTS

| | | |
|---|---|---|
| EP | 1 209 648 | 5/2002 |

* cited by examiner

APPARATUS FOR DETECTING POSITION INFORMATION OF A MOVING OBJECT

PRIORITY

This application claims priority to an application entitled "APPARATUS FOR DETECTING POSITION INFORMATION OF MOVING OBJECT", filed in the Korean Intellectual Property Office on Jun. 2, 2003 and assigned Serial No. 2003-35271, the contents of which are hereby incorporated by reference.

BACKGROUND OF THE INVENTION

1. Field of the Invention

The present invention relates to an apparatus for detecting position information of a moving object, and more particularly to an apparatus for detecting position information of a moving object on which is mounted a device for storing position information at a predetermined location of a road, and which controls a moving object to read its current position information from information stored in the device using an RF (Radio Frequency) signal, thereby detecting correct position information of the moving object.

2. Description of the Related Art

Typically, various moving objects (e.g., ships, airplanes, and vehicles, etc.) include a navigation system for determining a current position of the moving object and for informing a driver of the moving object of an optimum path from the current position to a desired destination. The navigation system determines a current position of a moving object using a GPS (Global Positioning System).

GPS is an abbreviation of Global Positioning System, which is for detecting current position information of moving objects using 24 artificial satellites in orbit around the earth at an altitude of about 20,183 km. In more detail, if electronic waves (e.g., a GPS signal) transmitted from the satellite recognizing a correct position of a corresponding moving object are transmitted to a GPS receiver mounted to an observation point, the GPS receiver is adapted to calculate a duration required for the electronic waves to be received, thereby calculating a current position of an observation point.

Therefore, a conventional navigation system mounts a GPS sensor to a predetermined location of a moving object, controls the GPS sensor to analyze a GPS signal received from more than four satellites, and thus determines a current position of the moving object.

Data received from the GPS unavoidably includes an ionospheric error, a satellite error, and a multipath error. If a moving object (e.g., a moving vehicle) having a GPS sensor travels a variety of road conditions such as huge/high building zones, a zone close to roadside trees, or a tunnel, it cannot receive a GPS signal, meaning that the conventional navigation system cannot inform a driver of correct position information.

To solve this disadvantage, the conventional navigation system further includes a specific device such as a DR (Dead Reckoning) sensor for detecting relative position information and traveling direction information of a specific moving object using previous position information of the moving object. However, such a conventional navigation system still has a disadvantage in that the DR sensor unavoidably includes a variety of errors such as an initial alignment error and a conversion-factor error.

SUMMARY OF THE INVENTION

Therefore, the present invention has been made in view of the above problems, and it is an object of the present invention to provide an apparatus for detecting position information of a moving object to minimize an error.

It is another object of the present invention to provide an apparatus for detecting position information of a moving object to minimize the cost of OAM (Operation, Administration, and Maintenance).

It is yet another object of the present invention to provide an apparatus for detecting position information of a moving object which mounts a device for storing position information at a predetermined location of a road, and controls a moving object to read its current position information from information stored in the device using an RF (Radio Frequency) signal, and thus detects correct position information of the moving object.

It is yet a further object of the present invention to provide an apparatus for detecting position information of a moving object which installs a plurality of small-sized devices for interchanging data using an RF signal at predetermined locations of a road and a moving object, and detects position information of the moving object upon receiving data from the small-sized devices, which are interoperable with one another.

In accordance with the present invention, the above and other objects can be accomplished by the provision of an apparatus for detecting position information of a moving object, comprising: a transponder installed on a predetermined location of a road for storing position information associated with the installed location; a communication module mounted to a moving object, for emitting an RF (Radio Frequency) signal toward a road surface and for receiving position information associated with the transponder's installation location from the transponder located within a predetermined distance from the moving object using the RF signal; and a reader for receiving position information associated with the transponder's installation location from the communication module, and reading a current position of the moving object.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
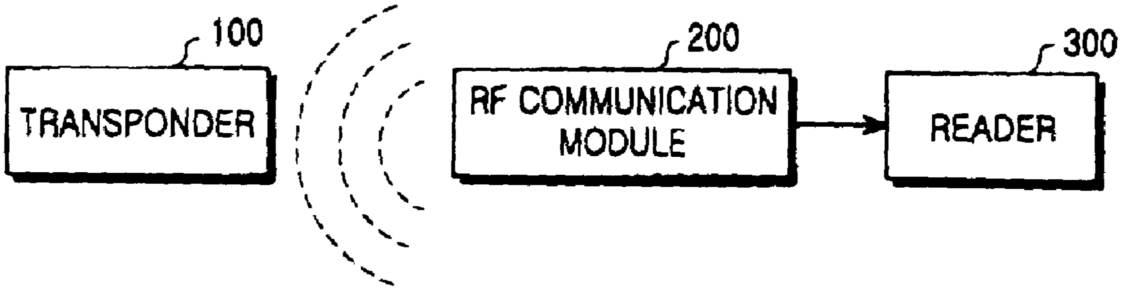
FIG. 1 is a view illustrating a block diagram of an apparatus for detecting position information of a moving object in accordance with a preferred embodiment of the present invention.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention unclear.

FIG. 1 is a view illustrating a block diagram of an apparatus for detecting position information of a moving object in accordance with a preferred embodiment of the present invention. Referring to FIG. 1, the apparatus for detecting position information of a moving object includes a transponder 100, an RF communication module 200, and a reader 300.

The transponder 100 is mounted to a predetermined position of a road, and stores position information of a corresponding road position. It is preferable for the transponder 100 to be mounted to each center of individual traffic lines at predetermined intervals.

An RFID (Radio Frequency IDentification) chip may be adapted as such a transponder. The RFID chip driven by electronic wave signals received from a reader stores predetermined information in a memory, or reads information pre-stored in the memory. Such an RFID chip has the following characteristics.

First, the RFID chip is conveniently used, simultaneously recognizes a plurality of tag information at a high speed, and thus reduces an overall data recognition time. Second, because the RFID chip has a very long sensing distance, it is easily applicable to various system characteristics and environments and also has a broadband application range. Third, the RFID chip has no error created by a malfunction of a reader because it is fabricated in the form of a non-contact type, resulting in a long lifetime and easier OAM. Fourth, it is impossible to forge data in the RFID chip, resulting in the security of data. Fifth, the RFID chip easily and simply creates an extended system. Sixth, the RFID chip can recognize two-way data.

The RFID chip having the aforementioned characteristics has been increasingly developed due to various reasons, for example, a process automation for manufacturing a small quantity of each of many articles, reduction of physical distribution costs, efficient material management, reduction of manpower, convenience provision for customers, the importance of customer management information, etc.

RFID chips are classified into an inductively-coupled RFID chip and an electromagnetic wave RFID chip on the basis of the type of communication media communicating with a reader. The inductively-coupled RFID chip communicates with the reader over a coil antenna, and is applied to an RFID system for use in a short distance, e.g. within 1 m. The electromagnetic wave RFID chip communicates with a reader over a high frequency antenna, and is adapted to an intermediate- or long-distance RFID system.

The inductively-coupled RFID chip is manually driven. That is, all energy needed for operating an RFID microchip is provided by a reader. An antenna coil of the reader outputs a signal very resistive to conditions of peripheral areas, and creates an electromagnetic field. If the electromagnetic field emitted from the reader partially creates an inductive voltage in an antenna coil of an RFID chip slightly separated from the reader, the inductive voltage is rectified and the rectified voltage is adapted as an energy source for the RFID microchip. It is preferable for the present invention to use an inductively-coupled RFID chip.

The RF communication module 200 is mounted to a predetermined position on a moving object, drives the transponder 100 spaced apart from the moving object by a predetermined distance (e.g., several meters) using a self-generated RF, reads data stored in a memory of the transponder 100, and thus transmits corresponding position information of the moving object to a reader 300. It is preferable for the RF communication module 200 to be mounted on a lower part of the moving object, such that the RF communication module 200 faces a road surface to communicate with the transponder 100 mounted to a predetermined location of a road.

The reader 300 reads current position information of the moving object upon receiving position information from the RF communication module 200. The reader 300 transmits the read position information to an external device. The external device compares previous position information of the moving object with current position information of the moving object, and calculates a distance between several transponders 100. The external device compares a read time of the previous position information with a read time of the current position information, calculates a traveling time of the moving object such as a moving vehicle, and calculates a moving speed of the moving object and speed information for every direction of the moving object upon receiving the calculated traveling time and distance information.

Figure 2:
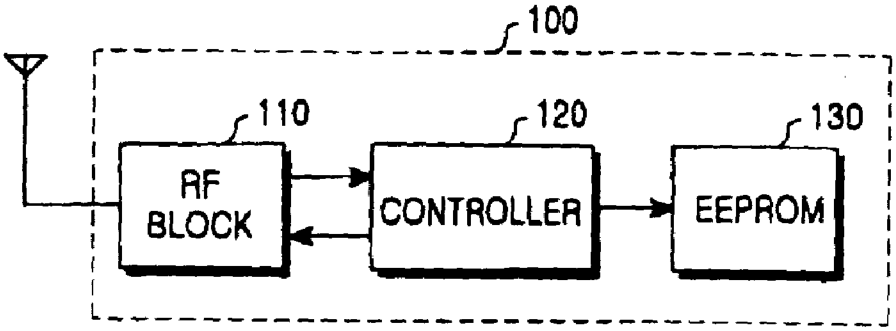
FIG. 2 is a view illustrating a block diagram of a transponder in accordance with the preferred embodiment of the present invention.

FIG. 2 is a view illustrating a block diagram of a transponder 100 in accordance with a preferred embodiment of the present invention. Referring to FIG. 2, the transponder 100 includes an RF block 110, a controller 120, and an EEPROM (Electrically Erasable Programmable Read Only Memory) 130. The RF block 110 receives an RF signal created from the RF communication module 200, transmits the received RF signal to the controller 120, and transmits data from the controller 120 to the RF communication module 200. The controller 120 is driven by the RF signal received from the RF block 110, and transmits information stored in the EEPROM to the RF block 110. The EEPROM 130 stores position information associated with a specific location at which the transponder 100 is mounted. Although a specific example where the EEPROM 130 is adapted as a storage media is shown in FIG. 2, other storage media other than the EEPROM 130 can be adapted to store position information therein.

Figure 3:
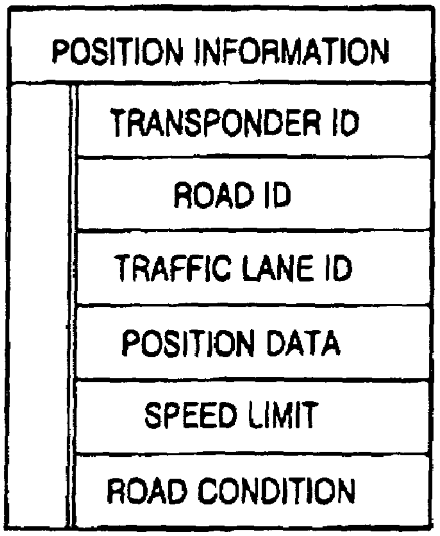
FIG. 3 is an exemplary view illustrating a data structure for storing position information of a moving object in accordance with the preferred embodiment of the present invention.

FIG. 3 is an exemplary view illustrating a data structure for storing position information of a moving object in accordance with a preferred embodiment of the present invention. In more detail, FIG. 3 shows an example of an internal configuration of data stored in the EEPROM 130. As shown in FIG. 3, individual EEPROMs 130 of individual transponders 100 arranged at predetermined intervals store correct position information corresponding to individual installation positions of the transponders 100. In this case, each EEPROM 130 stores various position information, for example, a transponder ID, a road ID, a traffic lane ID, position data, a speed limit, and traffic road conditions. The transponder ID is a unique value assigned to individual transponders mounted on a road. If the transponder ID is transmitted to the apparatus shown in FIG. 1, position information corresponding to individual transponder IDs can be retrieved and read from a database of an external device. The road ID includes ID (IDentification) information assigned to individual roads. Because the transponder must be separately mounted to individual traffic lanes, a traffic lane ID indicating a traffic lane number associated with a transponder's position is stored in the data structure shown in FIG. 3. The position information or position data stores absolute coordinate information associated with a specific position drawn on a map, such that it can inform a user of correct position information even though a navigation system mounted to a vehicle does not receive a GPS (or other data acquisition system) signal and thus has no correct position information of the moving vehicle. The speed limit information and the road condition information continuously indicate speed limit information of a current traveling road of the moving object, resulting in warning a driver of the danger of excessive speed. If a nearby area close to a transponder is a very dangerous area or a poor traffic condition area, the position information shown in FIG. 3 may further include additional information for indicating poor traffic conditions.

The aforementioned information stored in the transponder can be selectively used according to the type of external devices connected with the reader 300. For example, provided that such an external device is a navigation system, correct current position information of a moving vehicle and excessive speed alarm information may be selected from among a variety of information, examples thereof being shown in FIG. 3.

Figure 4:
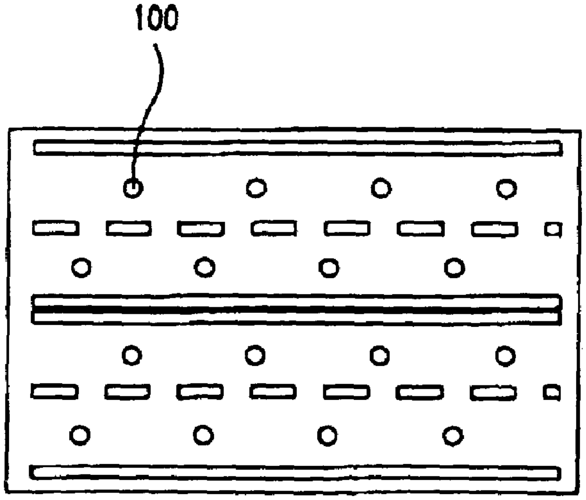
FIG. 4 is an exemplary view illustrating a transponder installed on a road in accordance with the preferred embodiment of the present invention.

FIG. 4 is an exemplary view illustrating the transponder 100 installed on a road in accordance with a preferred embodiment of the present invention. As shown in FIG. 4, because most moving objects travel along the center parts of individual traffic lanes, each transponder 100 is installed at the center parts of individual traffic lanes to easily communicate with the RF communication module 200 mounted to a predetermined position of a moving object. The transponder 100 may, for example, be installed only on a road where no GPS satellite information is received, such as a road contained in an urban area or a road inside of a tunnel.

Figure 5:
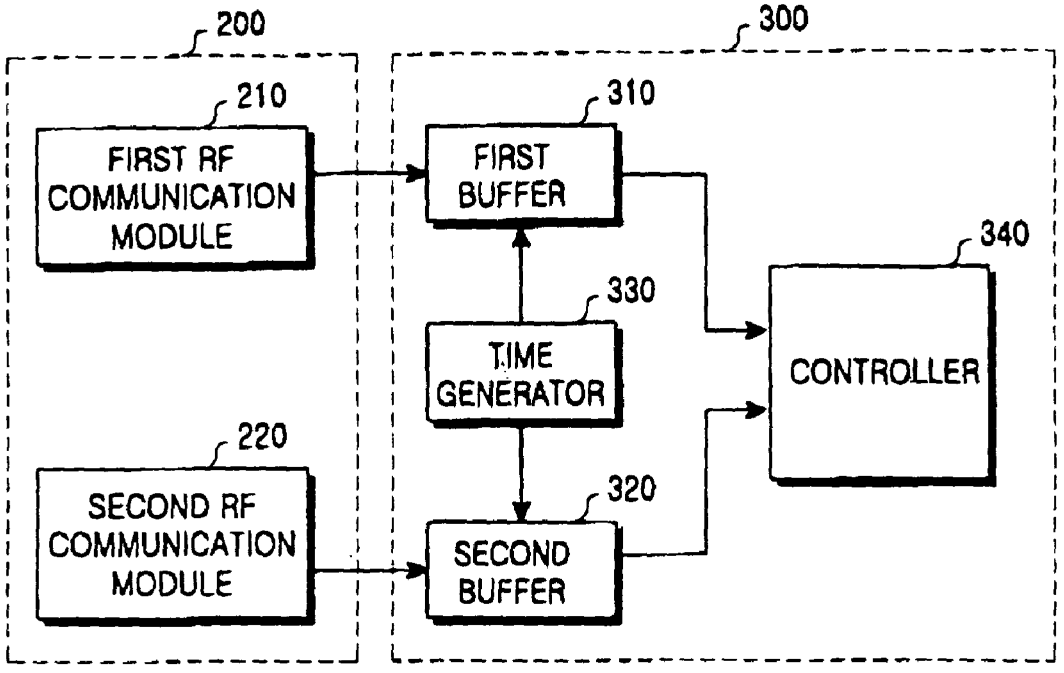
FIG. 5 is a view illustrating a detailed block diagram of an RF communication module and a reader in accordance with the preferred embodiment of the present invention.

FIG. 5 is a view illustrating a detailed block diagram of the RF communication module 200 and the reader 300 in accordance with a preferred embodiment of the present invention. Referring to FIG. 5, the RF communication module 200 includes first and second RF communication modules 210 and 220. The reader 300 includes first and second buffers 310 and 320, a time generator 330, and a controller 340.

The RF communication module 200 and the reader 300 are adapted to calculate a traveling speed of a moving object by detecting a duration time during which the moving object passes only one transponder 100. Preferably, the first RF communication module 210 is mounted to the front of the moving object, and the second RF communication module 220 is mounted to the rear of the moving object. The first and second RF communication modules 210 and 220 generate high frequency signals, respectively, operate their adjacent transponder 100 located within a predetermined distance from the moving object, and transmit position information created by communicating with their transponder 100 to first and second buffers 310 and 320 contained in the reader 300, respectively. The time generator 330 is composed of a CRC, etc., measures time, and transmits time information to the first and second buffers 310 and 320. The first and second buffers 310 and 320 collect position information and time information, and transmit the collected information to the controller 340.

The controller 340 detects real-time position information of a moving object upon receiving position information from the first and second buffers 310 and 320, and calculates a speed per section that the moving object travels at using the received position information and time information. In more detail, the controller 340 calculates a speed per section that the moving object travels at using time difference information containing position information of the same ID from among various position information received from the first and second buffers 310 and 320. In this way, provided the speed per section is correctly calculated, the controller 340 correctly recognizes speeds for every rotation per section at a crossroads. If rotation information for every rotation section is transmitted to a traffic information center, more accurate traffic information can be configured. For this purpose, the controller 340 should previously store information regarding an installation distance between the first and second RF communication modules 210 and 220.

Figure 6:
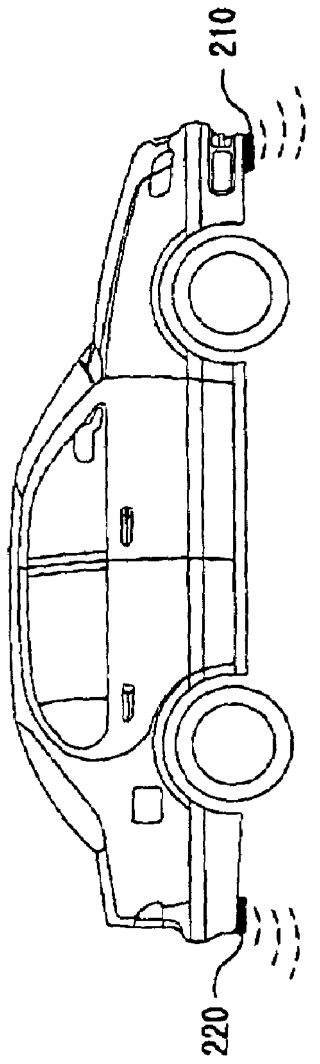
FIG. 6 is an exemplary view illustrating a moving vehicle including RF communication modules in accordance with the preferred embodiment of the present invention.

FIG. 6 is an exemplary view illustrating a moving vehicle including RF communication modules in accordance with a preferred embodiment of the present invention. Referring to FIG. 6, the first and second RF communication modules 210 and 220 emit RF signals toward a road surface. The first RF communication module 210 is mounted to the front of the moving vehicle, and the second RF communication module 220 is mounted to the rear of the moving vehicle.

Figure 7:
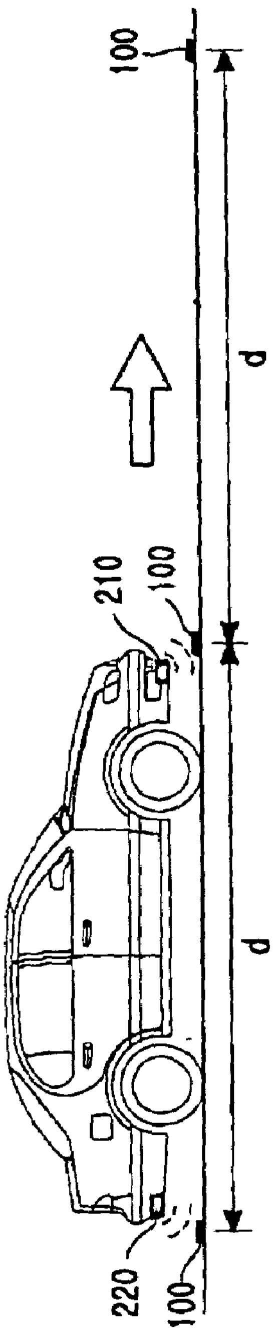
FIG. 7 is a view illustrating an example for use with a moving vehicle including the apparatus shown in FIGS. 2 and 5 in accordance with the preferred embodiment of the present invention.

FIG. 7 is a view illustrating an example for use in a moving vehicle including the apparatus shown in FIGS. 2 and 5 in accordance with a preferred embodiment of the present invention. Referring to FIG. 7, a moving vehicle having the first and second RF communication modules 210 and 220 travels a road on which a plurality of transponders 100 are arranged at regular intervals.

Figure 8:
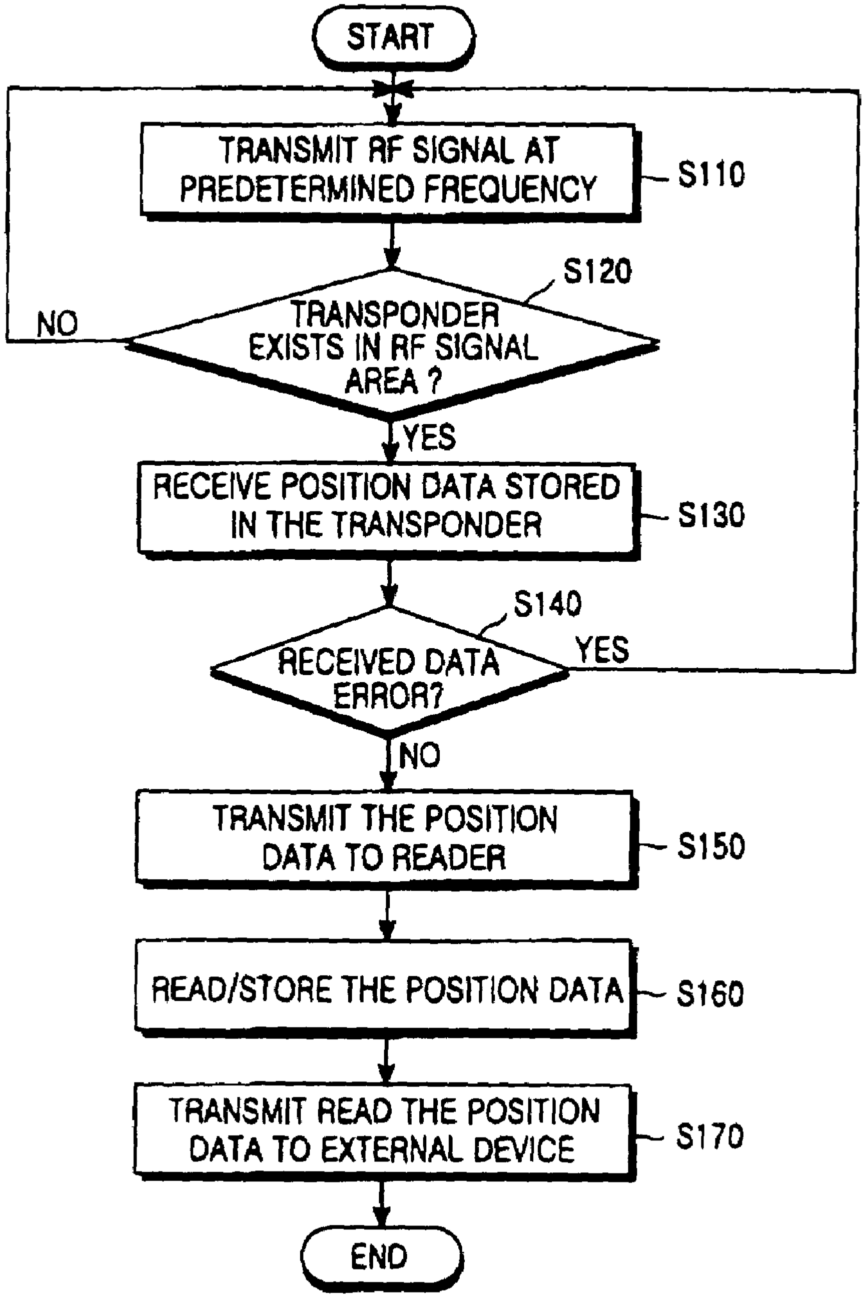
FIG. 8 is a flow chart illustrating a method for controlling the apparatus shown in FIGS. 2 and 5 to receive position information of a moving object and process the received position information.

FIG. 8 is a flow chart illustrating a method for controlling the apparatus shown in FIGS. 2 and 5 to receive position information of a moving object and process the received position information.

Referring to FIGS. 8 and 1, in order to receive position information of a moving object using the apparatus shown in FIG. 1, the RF communication module 200 transmits RF signals at a predetermined frequency at step S110, and receives position data stored in a transponder 100 at step S130 when the transponder 100 exists in a predetermined RF signal area at step S120. The RF communication module 200 determines whether there is an error in the received position data at step S140. If there is no error in the received position data at step S140, the RF communication module 200 transmits the received position data to the reader 300 at step S150. The reader 300 reads and stores the received position data at step S160, and transmits the read position data to an external device at step S170.

As described above, the apparatus shown in FIG. 1 can recognize an absolute coordinate position of all vehicles, and can effectively collect road information. Therefore, provided this collected road information is configured in the form of a database, a vehicle about to enter a blocked road can detour around the blocked road, resulting in increased road usage efficiency. The apparatus can correctly detect a current position of a specific vehicle and current positions of nearby vehicles, such that it can prevent a traffic accident between the vehicle and the nearby vehicles. Further, if a steering function is added to the transponder, an auto lane keeping function can be provided using position information of the transponder and a database associated with the position information, resulting in creating conditions for implementing an auto cruising function.

As apparent from the above description, the present invention installs an apparatus for storing corresponding position information at a predetermined location of a road, controls a moving object to read its current position information from the storage apparatus using an RF signal, and controls the moving object to detect its own current position information, resulting in minimizing a data error between the detected position information. A transponder installed on a road has no power-supply device because it is driven by the RF signal received from an external device, resulting in increased lifetime of the transponder. Further, the apparatus for detecting position information of a moving object according to the present invention minimizes the cost of OAM (Operation, Administration, and Maintenance).

Although the preferred embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. An apparatus for detecting position information of a moving object, the apparatus comprising:

an RFID chip installed in contact with a road surface, for storing position information associated with the installed location;

a communication module mounted to a moving object, for emitting an RF (Radio Frequency) signal toward a road surface, and for receiving position information associated with the chip's installation location from the transponder located within a predetermined distance from the moving object using the RF signal; and a reader for receiving position information associated with the chip's installation location from the communication module, and for reading current position information of the moving object.

2. The apparatus as set forth in claim 1, wherein the chip includes a memory for storing position information associated with the chip's installation location, a controller driven by the RF signal created from the communication module, for reading position information from the memory, and a RF block for receiving the RF signal from the communication module, transmitting the received RF signal to the controller, for receiving position information from the controller, and for transmitting the received position information to the communication module.

3. The apparatus as set forth in claim 2, wherein the memory stores ID (Identifier) information of individual chips, position information associated with installation positions of the chips, and road information associated with the installation positions of the chips.

4. The apparatus as set forth in claim 1, wherein the RFID chip is one of a plurality of RFID chips for storing position information associated with the installed location, and wherein the plurality of RFID chips are installed at center parts of individual traffic lanes and at regular intervals.

5. The apparatus as set forth in claim 1, wherein the communication module is adapted as a plurality of communication modules, one communication module being mounted to the front of the moving object, and another communication module being mounted to the rear of the moving object.

6. The apparatus as set forth in claim 1, wherein the reader stores position information received from the communication module and read time information for every position, and calculates moving speeds for every traveling interval of the moving object upon receiving a distance difference and a read time difference corresponding to individual position information.

7. The apparatus as set forth in claim 1, wherein the reader includes a buffer for storing position information received from the communication module, a time generator for generating current time information, and transmitting the current time information to the buffer, and a controller for receiving position information and time information for every position information from the buffer, detecting real-time position information of the moving object using the received position information, and calculating a moving speed of the moving object using the position information and the time information for every position information.

8. The apparatus as set forth in claim 1, wherein the reader transmits the read current position information to an external device.

9. The apparatus as set forth in claim 1, wherein the position information includes current position information and corresponding road condition information.

* * * * *